June 19, 1956     A. C. PETERSON     2,750,742
VEHICLE POWER OPERATED STEERING MEANS
Filed Aug. 18, 1952     2 Sheets-Sheet 1
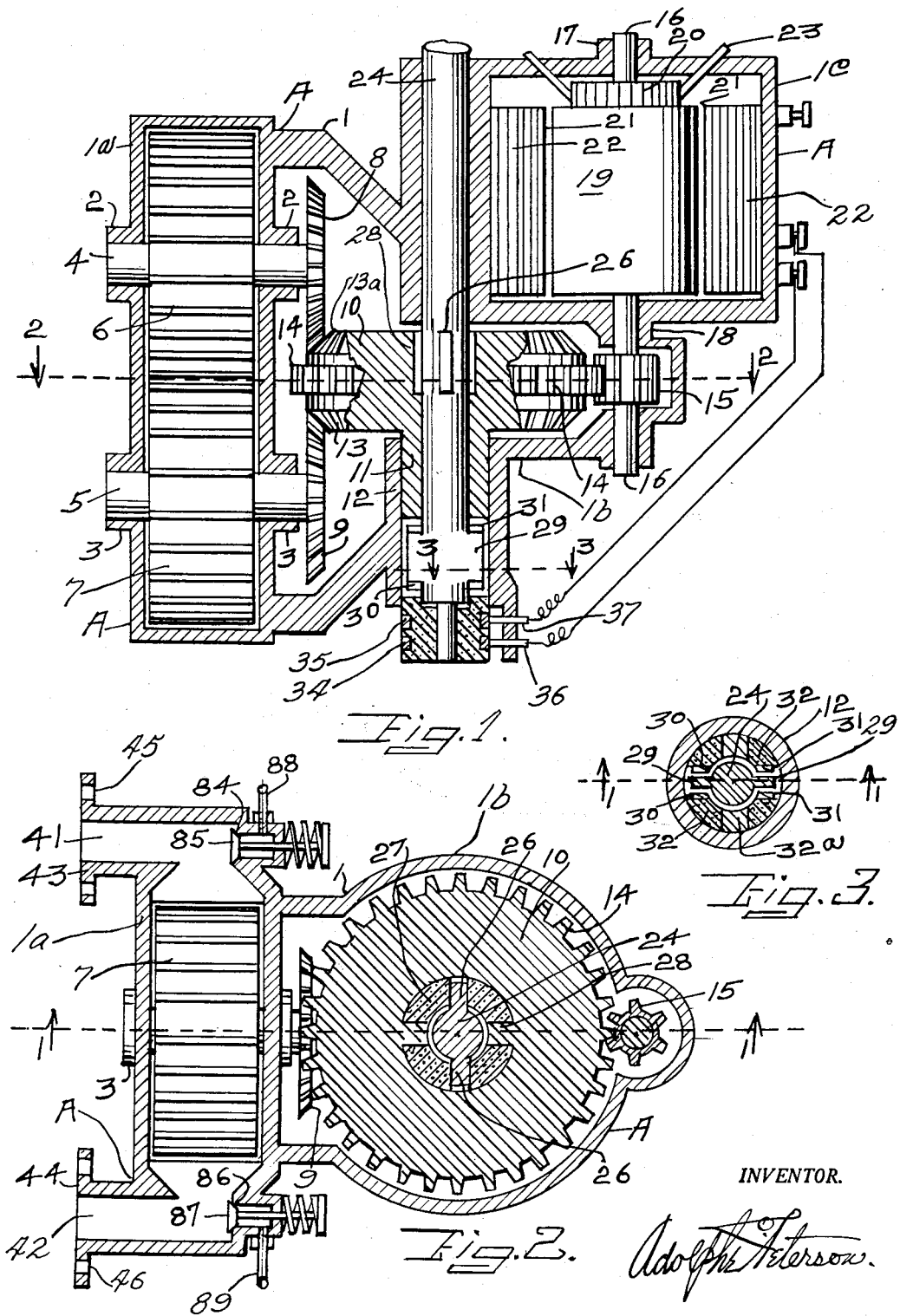
INVENTOR.
Adolph C. Peterson.

June 19, 1956     A. C. PETERSON     2,750,742
VEHICLE POWER OPERATED STEERING MEANS
Filed Aug. 18, 1952     2 Sheets-Sheet 2
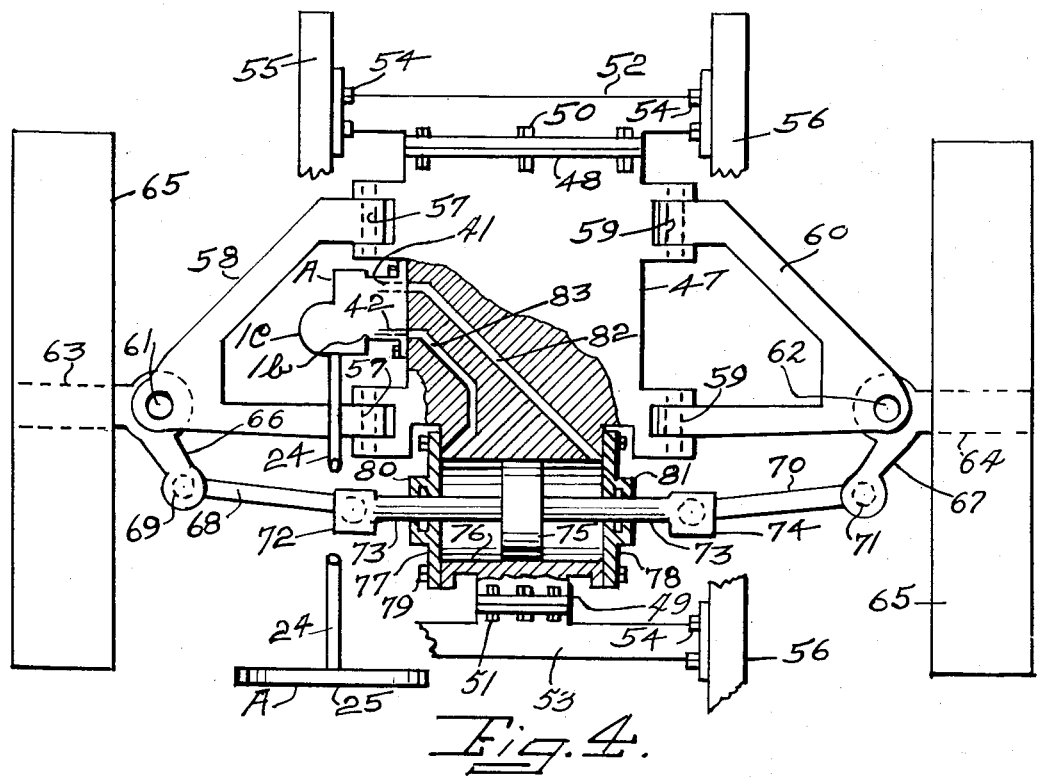
INVENTOR.
Adolph C. Peterson.

United States Patent Office 2,750,742
Patented June 19, 1956

2,750,742

VEHICLE POWER OPERATED STEERING MEANS

Adolphe C. Peterson, Minneapolis, Minn.

Application August 18, 1952, Serial No. 305,043

3 Claims. (Cl. 60—52)

My invention relates to automative vehicle steering means and particularly to a means in conjunction with manual lever means for power operated steering of the vehicle and is therefore called vehicle power operated steering means.

The chief objects of my invention are to provide a means for steering of vehicles which while power operated is simple in construction, relatively simple in operation, and relatively cheap in manufacture because of its relatively simple construction. An object is to provide such a power steering means which may readily be applied to automotive frame construction, which has relatively few parts in its manufacture and those parts of relatively simple construction and ease of manufacture and ease of assembly in a complete structure. An object is to provide a structure for the purpose indicated which structure shall be such as to provide reliability in action and reliability in construction and use, and have such means of operation as will more easily stand the abuse of shocks and wear in travel over the highways or roads. An object is to provide a structure for steering of vehicles, such a method of operation and control hydraulically, that it will not readily wear and that it will not easily be out of order, and that in any event in case of any failure of the power providing means, that it is immediately subject to the control of the driver of the vehicle by the manual lever means and through the hydraulic actuating means. In general the object is to provide an improved steering means which shall have power actuation or manual actuation according to necessity and which may readily be shifted from power to entire manual actuation, and which will more adequately serve the purpose of power steering means.

The principal devices and combinations of devices comprising my invention, are as hereinafter described and as defined in the claims. In the accompanying drawings which illustrate my invention, like characters refer to like parts throughout the several views. Referring to the drawings:

Figure 1 is a view in section through the axes of the operating elements of the chief actuating and control and power unit of my device, the unit designated A in Figure 4, the section being a section which is through the axis of the manual steering post, which may be at any angle to the vertical (as illustrated in Fig. 4) and on the line 1—1 of Figures 2 and 3, some parts being in full elevation as seen from an angle at right angles to the axis of the steering post.

Figure 2 is a view chiefly in section on a plane which is at right angles to the axis of the steering post of Figure 1 and is on the line 2—2 of Figure 1, some parts being seen in full plan view as seen from the angle described (referring to the unit as seen in Fig. 4).

Figure 3 is a detail view of a section on the line 3—3 of Figure 1, this section being a section merely through the electric current contacting means, the view being at right angles to the axis of the steering post.

Figure 4 is a view on a much reduced scale over that of Figures 1, 2, 3, to show the application of the unit shown in Figures 1, 2, 3, to the means accomplishing the transmission of the steering force to the means procuring turning of the steering road wheels on their pivots in the frame structure, the unit shown in Figures 1, 2, 3, being shown as the unit A in diagrammatic illustration, which is attached to the mounting structure for the road wheels, the power means associated directly with the mounting structure being shown in section on a plane which is a horizontal plane through that mounting structure and approximately on a horizontal level which is that of the plane passing through the axes of the road wheels of the vehicle, elements of the road wheel mounting structure being shown chiefly in diagrammatic form.

Figure 5 is a diagrammatic sketch showing the general diagram of the electric current connections and control in association with the electric motor armature and field coils.

Referring first to Figures 1, 2, 3, which show the control and power and chief actuating unit of my device, 1 is a unit which is a housing unit for the princpal operating elements and may be cast or formed of parts welded or otherwise secured together. This housing unit 1 is formed to have a gear pump casing 1a, a control gear casing 1b, and an electric motor casing 1c, and the housing unit may be made preferably of a metal which is durable and suitable for the construction. The gear pump casing 1a has a pair of shaft bearings 2 formed therein and another pair of shaft bearings 3 formed therein, and in these bearings there are rotatably mounted the two pump shafts 4 and 5, respectively, and these bear fixed on them, respectively, the pump gears 6 and 7, one fixed on each shaft, and these pump gears 6 and 7 are in permanent geared and pumping cooperation and in similar pumping cooperation or containment within the housing casing 1a, the cooperation of the pump gears 6 and 7 being the type of pump cooperation which is generally used in gear type pumps. The shafts 4 and 5 bear fixed on them, the two bevel gears 8 and 9, one fixed on shaft 4 and other fixed on shaft 5.

The two bevel gears 8 and 9 are in permanent engagement on opposite sides and at exactly the same radial location from the axis of a main control gear unit 10 which is rotatably mounted by its bearing sleeve 11 in the bearing fixture 12 formed with housing unit 1 and it is so mounted that it rotates on an axis which is in same plane as the axes of the shafts 4 and 5 but its axis is at right angles to those axes and slightly removed laterally from the bevel gears 8 and 9 and the latter gears are in engagement one with the bevel gear 13a formed on one side face of control gear unit 10 and the other with the bevel gear 13 formed on the other side face of the control gear unit 10, so that when control gear unit 10 is rotated it will rotate the bevel gears 8, 9 and accordingly also pump gears 6, 7, in opposite directions of rotation. The transmission to bevel gears 8, 9 is at an increased rate of speed, preferably. The control gear unit 10 has also formed integrally with it a spur gear 14 which is proportionately rather large, and this spur gear is in permanent engagement with a comparatively small spur gear 15 at the side opposite of control gear unit 10 to that of the bevel gears 8, 9.

The small spur gear 15 is fixed on the lower end of an electric motor shaft 16, and that shaft 16 is rotatably mounted in bearings 17, 18, formed in electric motor casing 1c and has mounted and assembled on it the electric motor armature 19, which has commutator 20, and rotates between field magnets 21 which have coils 22 wound on them, the latter more particularly described hereinafter. Brushes 23 mounted in the motor casing 1c contact the commutator 20 and are in a circuit as hereafter described. The electric motor 19—21, will drive spur gear 14 by a relatively large reduction and will drive to the bevel gears 8, 9 by a still larger reduction, but it should be noted that the ratios of drive may as to any of these gears be such as will be found most practicable and suitable in any particular construction.

The control gear unit 10 and its bearing sleeve 11 have mounted axially of them, but not rigidly fixed thereto, the steering post 24 which is as long as may be necessary for location of the steering wheel (a so-called lever), denoted 25, on its upper end and in a location within the associated vehicle body, which is appropriate for manual operation by a vehicle driver. The steering post 24 may be placed on an angle to the vertical which is say a forty-five degree angle or any suitable angle and slanted rearwardly in a vertical plane. The steering post 24, at the plane of Figure 2, has formed on it, diagrammatically oppositely, a pair of lugs or tongues 26 which are each relatively thin in section transversely of the steering post but relatively long in the direction of the axis of the steering post 24 so that they will have suitable strength, and these tongues are metal and formed with the post 24 and are each placed between sections of resilient rubber or other material designated 27. The sections 27 are four in number and are placed circumferentially of the post 24 each between one tongue 27 and one of the lugs or tongues 28 which are formed integrally with or secured to the internal bore at the plane of section of Figure 2 of the control gear unit 10, the relation of the tongues and resilient rubber being such that the steering post 24 will at all times, when there is not any steering pressure manually on the steering post 24 by wheel 25, be forced into a normal position rotationally relatively to the control gear unit 10, and that thus the steering post 24 is normally held in a normal positon, relatively, which is a so-called rotationally central position, and will not be forced away from this central position except by steering pressure exerted, lightly, by the driver, on the steering wheel 25. However, the resiliency of the rubber sections 27 is such that only a slight steering pressure need be exerted by the driver to rotate the steering post 24 in either direction against the yielding pressure of the rubber sections 27. When this yieldable retention of the steering post 24, relatively to control gear unit 10, is overcome there will be contact immediately as hereafter described, by the electric contact elements, which elements will procure such additional contacting or engagement of the steering post 24, that, if need arises, the steering post 24 may be then caused to turn control gear unit 10 in either direction, this being the case in the event that the electric motor operation should fail or be manually cut out, as hereafter described.

At the extreme lower end, the steering post 24 has another pair of tongues 29 fixed on it at diametrically opposite locations and in the same transverse plane. These tongues 29 are located one between the pair of contacts 30 and the other between the pair of contacts 31 and these two pairs of contacts 30 and 31 are electrically insulated from the metal of the gear unit 10 by rubber or other electrical insulation 32, this insulation being sufficiently hard and non-yielding that when contact is made against any of them the insulation 32 does not yield but serves to form a thrusting fixture of the contacts 30 and 31 relatively to steering post 24. The contacts are such that contact of tongues 29 will be made with two of the contacts, one 30 and one 31, when contact is made by turning of the steering wheel 25 by manual force, in either direction of rotation. Each pair of contacts, one 30 and one 31, are jointly in a circuit with one field coil 32 or the other field coil 33 through an annular ring 34 or 35, each of which is insulated and carried by the lower end of steering post 24, and either one of a pair of brushes 36 or 37. One of these field coils is a coil for producing one direction of rotation of armature 19 and the other is a coil for producing the other direction of rotation of armature 19, and the remaining end of each field coil is in circuit through the armature 19 with a battery 38 and by grounds 39 and 40 with the steering post 24 and thereby tongues 29. Thus a circuit through one field coil 32 or the other 33 is made as soon as the driver of the car by steering wheel 25 turns it against yielding pressure of the resilient rubber sections 27 so that tongues 29 make the contacts indicated, and the electric circuit is thus closed through the motor 19—21 for operation of the motor in the selected direction, and this will result in driving force by the motor 19—21 in the selected direction upon the large spur gear 14 and thereby upon bevel gears 8 and 9 and through them upon gear pumps 6, 7.

The housing unit 1 has a pair of passages 41 and 42, respectively formed in the gear pump casing 1a, one passage being on one side of the pair of pump gears 6, 7, and the other passage being on the other side of the pump gears 6, 7, and these passages are shown in Fig. 2 to pass to the faces 43, 44, respectively, of the gear pump casing 1a, so when the housing unit 1 is fixed in place by means of bolts through bolt holes 45, 46, the passages will be aligned with and connect with passages formed in the mounting unit, as hereafter described.

The unit which has been above described, is the chief actuating and control and power unit of my device, and is generally denoted A, and that unit A is used in conjunction with another unit of the steering system, which is the means by which the power generated by the unit A, is converted into mechanical movement to turn the steering road wheels of a vehicle.

The unit is in part formed with and in part assembled with the road wheel mounting structure. The chief element of this mounting structure is a mounting unit 47 which is generally in the form of a relatively large rectangular plate placed horizontally in a vehicle structure and fixed by means of its flanges 48 and 49 and bolts 50, 51, to transverse frame members 52, 53, respectively, one in front of it and the other behind it in the vehicle chassis frame. The transverse members 52, 53 are by bolts 54 fixed to the longitudinal frame or chassis members or rails 55, 56, of any automotive vehicle chassis. The mounting unit has on one side a pair of hinges 57 by which a wheel supporting bracket 58 is hinged to it and supported by it but movable by oscillation about the hinges as a pivot. The mounting unit has on the other side a pair of hinges 59 by which wheel supporting bracket 60 is hinged to it and supported by it but movable by oscillation about the hinges as a pivot. Each wheel supporting bracket 58 and 60 has mounted on it by means of the pivot pins 61, 62, respectively, the wheel spindles 63 and 64, respectively, and each of these has a road wheel 65 rotatably mounted on it. Each wheel spindle 63, 64 has formed with it or fixed to it, the steering cranks 66, 67, respectively. The supporting structure for the road wheels is generally described merely so that the road wheel structure is shown in the connection with the steering means, and it should be observed that any type of such wheel mounting means may be used, and that the wheel supporting brackets while shown by the single bracket means for each road wheel, may be any of double bracket types or other types which are commonly in use and known.

The wheel spindles may be turned about their pivots on the axis of pivot pins 61, 62, by the steering cranks 66, 67, by means of a pair of connecting rods, one of which, 68 is by a ball and socket joint or other type of universal joint 69 connected at its end leftwardly with one crank 66, and the other 70 is by universal joint of any type, 71, connected at one end to the other crank 67.

One connecting rod 68 is by a universal joint 72 connected to one end of a common intermediate connecting rod or piston rod, 73, which may generally be designated as the intermediate element. The other connecting rod 70 is by a universal joint 74 connected to one end of the common intermediate element 73. The ends connected to intermediate element 73 are the ends opposite to the ends which are connected to the steering cranks 66, 67. The intermediate element 73 has fixed on it a piston 75 which is reciprocable within a cylinder bore 76 formed in one end of the mounting unit 47 transversely of the latter and at a level such that the horizontal axis of the cylinder bore 76 is substantially at the same level as the steering cranks 66, 67. The cylinder bore as formed in mounting unit 47 is a bore open at both ends but this cylinder bore is closed at each end by cylinder heads 77, 78, which are bolted by bolts 79 on the mounting unit 47, the intermediate element 73 being slidable in packed members 80, 81, respectively, so that liquid will be retained within the cylinder bore. One end of the cylinder bore 76, on one side of the piston 75 is connected by a conduit 82, formed in the metal of mounting unit 47, with one passage 41 and the other end of cylinder bore 76, on the other side of piston 75 is connected by a conduit 83, formed in the metal of mounting unit 47, with the other passage 42. Thus one end of the cylinder bore 76 is connected directly and permanently with one passage on one side of the pair of pump gears 6, 7 and the other end of the cylinder bore 76 is connected, directly and permanently with the other passage on the other side of the pair of pump gears 6, 7, so that flow from the pump gears 6, 7 is from one side of the pump gears to or from one side of the piston 75 and flow from the pump gears 6, 7 is from one side of the pump gears to or from the other side of the piston 75, and the flow in either case is determined by the direction of the turning of the pump gears 6, 7, by the means which was described in connection with unit A.

The proportions of the cylinder bore 76 and piston 75 are preferably such that there will be several or a number of turns of the pair of pump gears 6, 7 to a full movement or stroke of the piston 75 in either direction of its movement, and the proportions of the spur gear 14 and the bevel gears, are preferably such that there will be several or a number of turns of the steering wheel 25 to procure movement of piston 75, and there will be several or a number of rotations of the pump gears 6, 7 to each turn of the steering wheel 25. Thus there may be a relatively fast rotation of pump gears 6, 7 when the steering wheel 25 is turned through several rotations, and the actuation of the pump gears will be relatively fast so that they may be relatively small, and the piston 75 and intermediate element 73 will move relatively slow as compared to the fast rotation of the pump gears 6, 7, so that thus the pump gears need not be cumbersome and any slight leakage will be relatively unimportant as compared with the movement of the steering wheel 25, that is with reference to leakage within the casing 1a around the pump gears, but they should be constructed with as little clearance as possible, with assurance of rotation, so that this leakage may be avoided. There should be such packing at any bearings that leakage out of the system will be avoided. Some provision should be made for supplying oil to the hydraulic system.

The passage 41 of the unit A has delivery to it, by way of a non-return valved port 84 having non-return valve 85, of oil as lubricating oil which may be under a low pressure of say thirty to fifty pounds as may be used in an engine lubricating system. The passage 42 has delivery to it, by way of a non-return valved port 86 having non-return valve 87, of oil as lubricating oil which may be under pressure of say thirty to fifty pounds as may be used in an engine lubricating system. These ports deliver oil as may be needed to restore any oil lost from the conduit system by any slight leakage and the delivery is from the conduits 88 and 89 from the engine lubricating system, the pressure side, or any pressure system. This is provision against any loss of ability of the system to transmit the steering actuation at any time. The pressure of delivery is the same on both sides.

Having described in detail the construction of the steering system, its operation in general is now explained. There is provided a hand switch 90 by means of which the circuit may be broken or closed through the electric motor control, as the driver may desire, so that in this manner, the driver may at any time he chooses change the steering control from a power assisted steering control or actuation to a wholly manual actuation, so that in this manner the driver may accustom himself to the situation which might accidently arise, in the event that there was any power failure in the electric circuit from the battery 38. Normally the hand switch 90 is closed while the vehicle is in use, and in that event the operation is as follows: The vehicle will be assumed to be under actuation for travel by the engine which may be in the vehicle, this engine being not shown, since it is contemplated that the vehicle is a power driven vehicle of any kind, as is usually used. If the driver wishes to turn the vehicle to one side or direction, he turns the steering wheel 25 in the direction desired and as soon as he gives the initial thrust on the wheel in that direction, the tongues 26 will slightly compress the resilient rubber sections 27 in the direction desired and the steering post 24 will be thus turned against the yielding resilient sections 27 until the tongues 29 make contact with one pair of contacts including one contact 30 and another contact 31, each contact 30 being united with one contact 31 by conductors of current (Fig. 5), and thereupon current flows through a circuit consisting of that selected pair of contacts 30 and 31, one of the annular rings 34 or 35, one of the field coils 32 or 33, the armature 19, the battery 38, the grounds 39, 40, and the steering post 24 and tongues 29, so that thus a circuit is completed in the selected way, so that one field coil giving driving impulse to the armature 19, in the desired direction is energized, and thereupon current flows continuously as long as the contacts selected and thus made, remain closed, and this will be as long as the driver continues to exert turning pressure in the direction of travel desired, and as long as this turning of the vehicle by turning of the road wheels and vehicle propulsion, has not been accomplished. As soon as the road wheels for steering have been turned to the extent indicated by the turning of the steering wheel 25 by the driver, the electric motor will have turned with steering post 24 to such an extent and by such a number of rotations, that contact of the selected contacts 30 and 31 with tongues 29 is broken, this happening since the driver no longer turns the wheel 25, and when the circuit is thus broken, the electric motor will no longer produce driving torque on the spur gear 14 and the road wheels will then retain the position selected until some further effort is exerted by the driver in the same or the other direction. Any shock imparted to the steering road wheels by any impact encountered in travel, will tend to exert some impulse against the spur gear 14 through the liquid in the conduit system, and if the spur gear 14 is given a sufficient impulse to slightly turn it, the contacts of the selected pair (according to the impulse), would contact the tongues 29 and cause a circuit to be closed for driving of the electric motor in the direction, according to the impulse received. Reverse or shock effect is cushioned by the liquid.

Whenever any contact is made, as above described, the armature 19 through spur gear 15 will transmit driving torque in the selected direction, by a considerable reduction of speed, against spur gear 14, and this will cause bevel gears 13a, 13, to drive bevel gears 8, 9 and thereby drive pump gears 6, 7 to pump the contained liquid or oil in the desired direction, that is from one passage 41 or 42 to the other passage 41 or 42, so that liquid is caused to flow from one side of the piston 75 to the other side of the piston 75 and thus the piston 75 and with it the intermediate element 73 is caused to move in the selected direction to pull on one connecting rod 68 or 70 and thrust on the other connecting rod 68 or 70, and this action is imparted through the cranks 66, 67, to the wheel spindles 63, 64, and thus to the road wheels.

In the event that there is any failure of the electric conductive system or the battery, which continuously is charged as usual in automobiles, by a generator (not shown), or in the event the driver cuts out the battery 38 by hand switch 90, the driver would immediately have continued control of the steering road wheels, by manual direction, as in that case, he would, according to the need, turn the steering wheel 25, as in the power assisted steering, and the tongues 26 pressing against rubber sections 27, would also be assisted by the tongues 29 pressing against the contacts, one pair 30 and 31 (one of each), and through the non-yielding sections 32 which would press against the lugs or tongues 32a in the bearing sleeve 11, thus imparting steering torque through sleeve 11 which is integral with or securely fixed to spur gear 14, and thus to the gears and the pump gears 6, 7, as in the case when they are power driven. The tongues 26 press against sections 27 which in turn press against the lugs or tongues 28 which are formed integrally with or secured to the internal bore of the control gear unit 10 (Fig. 2). It should be observed, however, that in manual steering, the major part of the torque against the control gear unit 10, will be imparted through the tongues 29, hard or non-resilient sections 32, tongues 32a, sleeve 11, as sections 27 are resilient and compress only until the tongues 29 contact contacts 30, 31, either pair. The degree of rotation of steering post 24, and tongues 29, before contact of contacts 30—31 (either pair), is made will depend on the construction, but preferably this should be only a very slight movement, as little as possible according to the construction. While there are shown the resilient rubber sections 27, as yieldable means to normally station the steering post 24 and tongues 29, relatively to contacts 30—31, there may be any type of resilient or yielding means such as coil springs, or leaf springs or an equivalent means.

It should be noted that pressure of liquid from the supply through conduits 88 and 89 will not affect operation, except to keep conduits full, since the pressure is exactly the same from each conduit 88, 89, and it is contemplated the supply to conduits 88, 89 will be from the same pressure source. If the pressure in conduits 88, 89 is thirty pounds, the pressure in passages 41, 42 will be that until control action changes it, and in that event the non-return valves 85, 87, prevent any return of liquid so that pressure may increase on one side of the system according to the control. It is desirable that the pressure in the system be greater than atmospheric pressure since the devices may then be somewhat smaller, and also the greater pressure tends to aid in the maintenance of direction of travel by the vehicle road wheels 65, as the pressure of liquid against the piston 75 tends always to keep the intermediate element 73 and its connected elements in the straight forward or any selected position.

The brackets 58 and 60 are not shown in association with vehicle chassis spring means but it is contemplated that any such means as usally used will be associated with them. It would be advisable or convenient for the vehicle to have any means in association with the steering road wheels 65 which would indicate to the driver the relative position or steering angle of the road wheels, in order that he would at any time be aware of the position, if he desires, but such a means is not shown since it may be of any type as may be known or used, or any type such as may be adopted for use with the vehicle. The means for automatic supply of liquid to the system may or not be used according to the particular objects or desire in the particular construction.

While I have shown particular devices and combinations of devices in the illustration of my invention, I contemplate that other detailed devices and combinations of devices may be used in the realization of my invention without departing from the spirit and contemplation thereof.

What I claim is:

1. A means for pumping of liquid to or from opposite sides of a reciprocable piston means for road wheel steering actuation, and comprising: a pump means reversible in its operation to pump fluid either way and a conduit from one side of the pump means to one side of the said reciprocable piston means and a conduit from the other side of the pump means to the opposite side of the said reciprocable piston means, the said pump means comprised of a pair of pump rotor gears, each pump rotor gear having fixed thereto a bevel gear, a driving element having a pair of bevel gears and an intermediate spur gear, the last named pair of bevel gears located one on one side of the intermediate spur gear and in engagement with one of the first named bevel gears and the other located on the other side of the intermediate spur gear and in engagement with the other of the first named bevel gears, a smaller driving spur gear in engagement with the first named spur gear to drive it at reduced speed, the said driving element having means for manual rotation thereof in interconnection therewith.

2. All of the means as described and as claimed in claim 1 and in combination therewith; an electric motor having a driving shaft in interconnection with the said smaller driving spur gear to impart driving torque to it in either direction and control means for the electric motor.

3. All of the means as described and as claimed in claim 1 and in combination therewith; an electric motor having a driving shaft in interconnection with the said smaller driving spur gear to impart driving torque to it in either direction, and the said means for manual rotation of the said driving element, including, control means operably interposed between the said driving element and the said means for manual rotation, the said control means comprising yieldable means interposing yieldable opposition to movement either way of the means for manual rotation relative to the said driving element and contact means closed by movement one way relatively of the means for manual rotation to procure driving torque by the electric motor one way and closed by movement the opposite way relatively to procure driving torque by the electric motor in the opposite direction.

References Cited in the file of this patent

UNITED STATES PATENTS

| | | |
|---|---|---|
| 692,879 | Lemp | Feb. 11, 1902 |
| 1,144,552 | Lardner et al. | June 29, 1915 |
| 1,364,872 | Feightner | Jan. 11, 1921 |
| 1,429,101 | Ross | Sept. 12, 1922 |
| 1,615,075 | Francis | Jan. 18, 1927 |
| 1,747,768 | Fuller | Feb. 18, 1930 |
| 1,806,136 | Weiss | May 19, 1931 |
| 1,863,567 | Fisher | June 21, 1932 |
| 2,178,073 | Hardy | Oct. 31, 1939 |